United States Patent [19]

Kidd et al.

[11] Patent Number: 5,008,653

[45] Date of Patent: Apr. 16, 1991

[54] FLUID DETECTOR WITH OVERFILL PROBE

[75] Inventors: Roy E. Kidd, Clayton; Raymond J. Andrejasich, Carmel; Hilary Michel, Plainfield; Laurence S. Slocum, Indianapolis, all of Ind.

[73] Assignee: Emhart Industries, Inc., Towson, Md.

[21] Appl. No.: 455,577

[22] Filed: Dec. 22, 1989

[51] Int. Cl.$^5$ ............................................. G08B 21/00
[52] U.S. Cl. .................................... 340/620; 340/521; 73/304 R
[58] Field of Search ............... 340/617, 620, 619, 521, 340/522; 73/49.2 T, 304 R

[56] References Cited

U.S. PATENT DOCUMENTS

| | | | |
|---|---|---|---|
| 4,231,025 | 10/1980 | Turner, Jr. ........................... | 340/521 |
| 4,646,069 | 2/1987 | Andrejasich et al. ............... | 340/620 |
| 4,682,157 | 7/1987 | Mussmann et al. .................. | 340/620 |
| 4,736,193 | 4/1988 | Slocum et al. ....................... | 340/620 |
| 4,835,522 | 5/1989 | Andrejasich et al. ............ | 73/49.2 T |

*Primary Examiner*—Joseph A. Orsino
*Assistant Examiner*—Jill Jackson
*Attorney, Agent, or Firm*—Edward D. Murphy

[57] ABSTRACT

A fluid detection system includes a central monitor, an overfill probe for detecting the approach of the overfill condition of a tank of liquid, and n other probes, where n is an integer greater than or equal to 1. The probes are connected to the monitor via electronic cables. The monitor communicates with the probes by producing probe identifier signals comprising integers starting with zero up to the number n. Each probe includes a signal receiving and sending means which compares the identifier signal sent by the monitor to a preset identifier number for that probe and sends a status signal indicative of the fluid status at that probe when it receives the identifier signal that is the same as the preset number. The overfill probe is set with the identifier zero. The monitor includes a timing circuit which determines a six second probe check cycle. The monitor checks one probe every probe check cycle according to the following sequence: probe zero, probe number one, probe zero, probe number two, probe zero, probe number three, etc. until all n probes are checked. The monitor also includes an interrupt mode which may interrupt the probe check function. Whenever the monitor returns from interrupt, it first checks the zeroth probe then continues in the probe check cycle from which it was interrupted.

8 Claims, 5 Drawing Sheets

FLUID DETECTOR WITH OVERFILL PROBE

BACKGROUND OF THE INVENTION

1. Field of the Invention

The invention in general relates to fluid detection systems, such as for detecting the presence of or the amount of gasoline in or outside of a tank, and in particular, such a detection system having an overfill probe.

2. Description of the Prior Art

U.S. Pat. No. 4,646,069 issued to Raymond J. Andrejasich and Roy E. Kidd discloses a fluid detection system which is exemplary of systems for detecting the presence of fluid pollutants. Such systems typically include detection probes which are placed in the region of possible sources of pollutants, such as gasoline storage tanks. The probes are connected by wires to a central monitoring station which monitors the probe status. In many such systems, the monitor provides a plurality of probe signals, each signal associated with a specific probe. Further, each probe includes a receiving and sending circuit which includes an identifier number assigned to the probe. The probe provides a signal indicating the probe's status upon reception of the probe signal associated with the identifier number assigned to that probe In this way, the monitor can provide the probe status correlated with specific probes.

Pollulert TM Fluid Detection Systems Installation and Operation Instructions for Pollulert Control Center FD-103, Pollulert Systems document No. 961-40355-01 Revision Level 3, particularly at pages 24 through 27, describes a system such as that described in the above-mentioned U.S. patent that also includes an overfill probe. In this system, the overfill probe is assigned an identifier number and reports its status just as any other probe Generally, leak detection systems for tanks are designed to check the status of the probe about once a minute. This is more than sufficient since leaks generally develop in a tank over relatively long periods or are caused by catastrophic events which draw attention to the leak. However, it is generally preferable to check an overfill probe on the order of every five seconds or so, since otherwise one would have to set the threshold level such that the approaching overfill is alarmed at a level which would leave a relatively large volume of the tank unfilled at the time of alarm. This presents a problem since checking all the probes in a system such as described above at a sufficiently fast rate that the overfill probe is checked every five seconds or so would require much more expensive electronics. U.S. Pat. No. 4,835,522 describes a fluid detection system which solves this problem by checking the overfill probe in a special routine that is implemented only when a flow meter indicates that the tank is being filled. While this is effective, it does require a flow meter, which is relatively expensive. It would be useful to have a leak detection system in which an overfill probe could be included without also requiring the more expensive electronics or a flow meter.

SUMMARY OF THE INVENTION

It is an object of the invention to provide a fluid detector having an overfill probe which overcomes one or more disadvantages of the prior art fluid detectors.

It is another object of the invention to provide the above object with a relatively inexpensive fluid detector in which the overfill probe is regularly checked at least once every reasonably short period of time.

It is a further object of the invention to provide one or more of the above objects with a fluid detector in which the overfill probe is identified by the number zero.

The invention provides an apparatus for detecting the presence of fluids comprising: a plurality of probes for detecting the fluid state of their environment, the probes including an overfill probe for detecting the approach of the overfill condition in a tank of liquid; and monitor means for checking the status of the probes, the monitor means including overfill checking means for checking the overfill probe at least once during each predetermined time period while the monitor means is operating, the predetermined time period being shorter than the time to check all of the other probes; and means for electrically connecting the monitor means and the probes. Preferably, the overfill checking means comprises means for checking the overfill probe after each of the other probes is checked and before the next one of the other probes is checked. Preferably, the apparatus further includes means for identifying the overfill probe and each of the other probes with a unique identifier, the identifier for the overfill probe being the numeral zero and the identifier for each of the other probes being an integer equal to or greater than one. Preferably, the overfill probe includes a master probe and one or more slave probes. Preferably, the predetermined time is six seconds.

In another aspect, the invention provides apparatus for detecting the presence of fluids comprising: a plurality of probes for detecting the fluid state of their environment; monitor means for producing a plurality of probe signals, one signal uniquely associated with each of the probes; and means for electrically connecting the control means and the probes; wherein each of the probes includes a signal receiving and sending means for producing a status signal indicative of the fluid state of the environment of the probe upon reception of the probe signal associated with that probe; the monitor means includes output means responsive to the status signals for producing an indication of the detected state correlated with each of the probes; and one of the probes is an overfill probe and the signal associated with the overfill probe is a signal representative of the number zero. Preferably, the monitor means includes: interrupt means for interrupting the production of the probe signals, return means for returning to the production of probe signals after interruption by the interrupt means; and means for producing the probe signal representative of the number zero first upon return from interrupt. Preferably, the monitor means further includes means for producing the probe signal representative of the number zero more frequently than the probe signals associated with probes other than the overfill probe.

The invention not only provides a fluid detector that checks the overfill probe reasonably frequently without significant additional expense as compared to systems without overfill probes, but also provides a fluid detector in which erroneous programming is significantly reduced. Since the overfill probe is always the zeroth probe, programming in which the overfill probe is erroneously identified as one of the other probes is eliminated. Numerous other features, objects, and advantages of the invention will become apparent from the following detailed description when read in conjunction with the accompanying drawings.

DESCRIPTION OF THE PREFERRED EMBODIMENT

Figure 1:
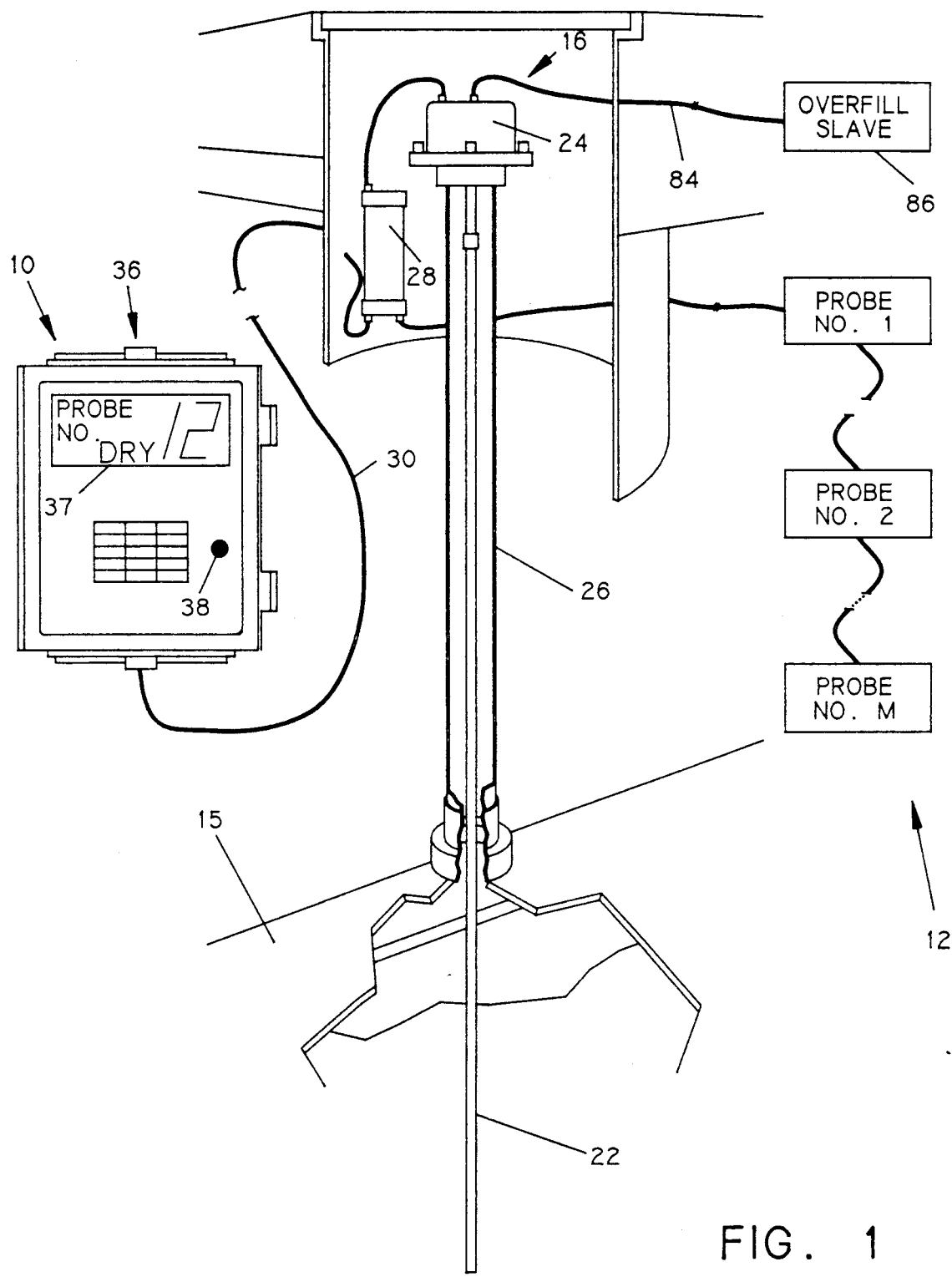
FIG. 1 is a diagramatic view of fluid detectors according to the invention with the overfill probe, the tank to which the probe is attached, and the manhole in which the overfill probe is installed partially cut away.

Directing attention to FIG. 1, a diagramatic view of a fluid detector according to the invention is shown. It should be understood that this and other embodiments of the invention shown herein are exemplary only and are not intended to limit the invention to the particular embodiments shown. The invention includes a central monitor means 10, which may be located on the wall of the office in a service station for example, and a plurality of probes 12, which may be located in, on, or outside of an underground tank 15, for example. One of the probes 12 is an overfill probe 16. The probes 1 through M may be probes as described in U.S. Pat. No. 4,682,157 which is hereby incorporated by reference, with the identifier means 20 as shown in FIG. 4 and described below. Or other probes, such as those described in U.S. Pat. No. 4,835,522 may be used. The monitor means 10 may be as described in U.S. Pat. No. 4,736,193, which is hereby incorporated by reference, with the additional software programming as described below in reference to FIGS. 3 and 5.

Figure 2:
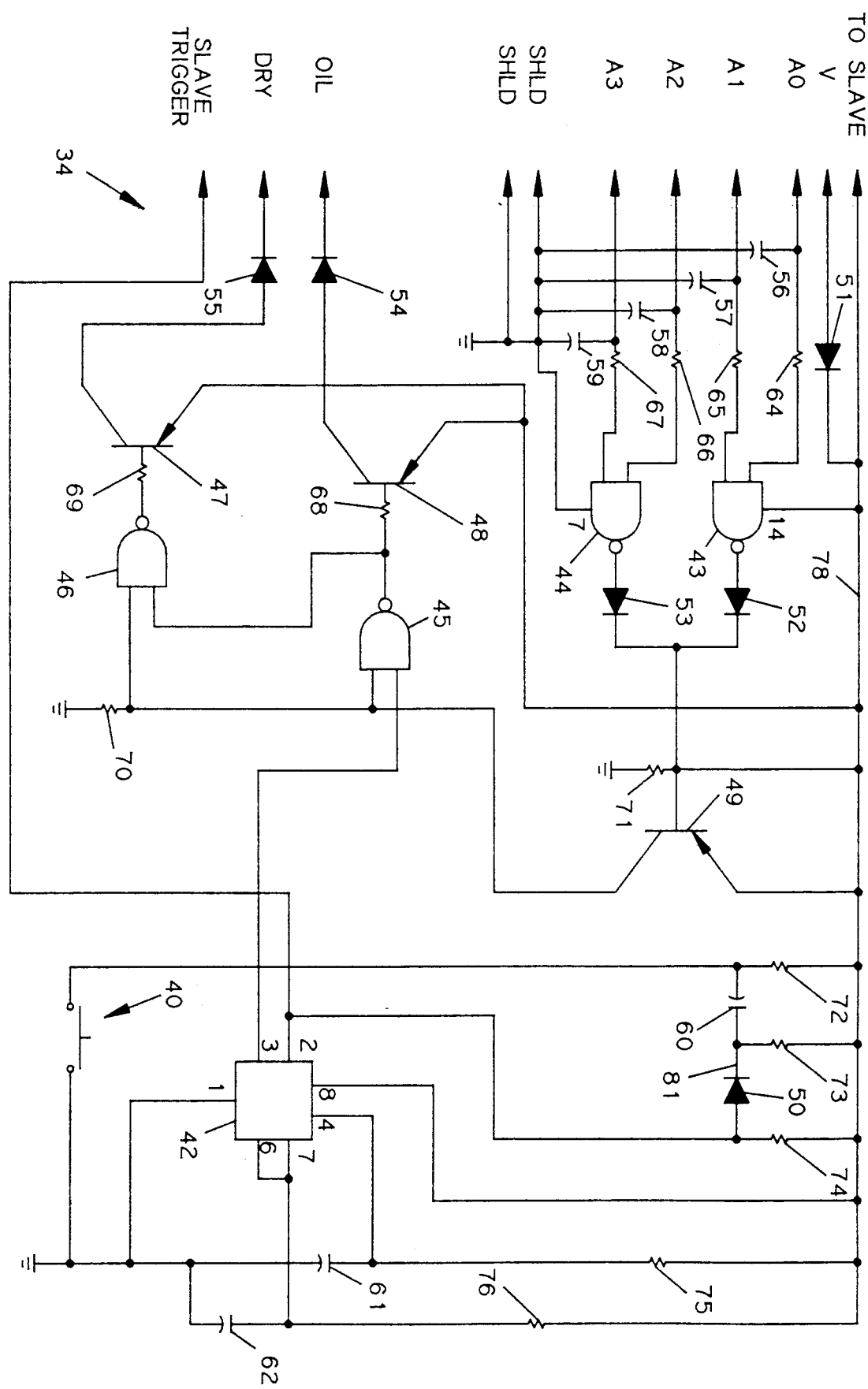
FIG. 2 is a circuit diagram of the electronics in the probe cap of the preferred embodiment overfill probe of FIG. 1.

The overfill probe 16 includes a sensor pipe 22 which passes into the tank 15, and which is connected to a probe head 24 which contains the probe electronics shown in either FIG. 2 or FIG. 4. The probe 16 is mounted on a riser pipe 26 which in turn mounted on tank 15. A splice cartridge 28 is used to splice the probe to an electrical cable 30 which connects to the monitor means 10. Each of the probes 12 detects the fluid state of their respective environments. The monitor means 10 periodically checks the status of the probes 12. As described more fully in U.S. Pat. No. 4,736,193, it provides a plurality of probe signals, one signal associated with each probe 12. Generally, the probe signals comprise digitally encoded numbers, one number associated with each probe 12. As will be described more fully below, each probe includes a signal receiving and sending means 34 (FIGS. 2 & 4) which, upon reception of the probe signal associated with that probe, produces a status signal indicative of the fluid state of the environment of the probe. The monitor means 10 includes an output means 36, which may include a display 37 and an alarm 38, which is responsive to the status signals from the probes 12 for producing an indication of the detected state correlated with each of the probes 12. In the preferred embodiment of the invention, the probe signal associated with the overfill probe 16 is the number zero and the monitor means 10 sends the probe signal zero every other time that it sends a probe signal, thus the overfill probe 16 will report its status before and after each of the other probes 1 through M is checked.

Turning now to FIG. 2, an electrical circuit diagram of the electronics within overfill probe head 24 is shown. The circuit includes pressure switch 40, timer 42, NAND gates 43, 44, 45 and 46, which are part of a CD4011 integrated circuit chip, PNP transistors 47, 48, and 49, diodes 50 through 55, capacitors 56 through 62, and resistors 64 through 76. The numbers on inputs to gates 43 and 44 and timer 42 refer to the pin numbers of the respective IC chip. The lines A0, A1, A2 and A3 connect via cable 30 to the output of monitor means 10 to which the probe signal is applied. The A0 and A1 signals are applied to the inputs of NAND gate 43 through resistors 64 and 65 respectively. The A2 and A3 signals are applied to the inputs of NAND gate 44 through resistors 66 and 67 respectively. The inputs A0 through A3 are also tied to ground through capacitors 56 through 59. The No. 14 pin of gate 43 is connected to line 78 which is connected through diode 51 to the power input V which connects to the monitor means 10 via cable 30. The No. 7 pin of gate 44 is connected to the system ground or shield of cable 30. The outputs of NAND gates 43 and 44 are applied to the base of transistor 49 through diodes 52 and 53, respectively, which is also connected to ground through resistor 71 and to the power line 78. The emitter of transistor 49 is connected to the power line 78 while the collector is connected to one input of each of gates 45 and 46 and to ground through resistor 70. One side of switch 40 is connected to the power line 78 through resistor 72 and to the No. 2 pin of timer 42 through capacitor 60 and diode 50. The line 81 between capacitor 60 and the cathode of diode 50 is connected to the power line 78 through resistor 73. The anode of diode 50 is connected to the power line 78 through resistor 74. The other side of switch 40 is connected to the No. 1 pin of timer 42 and also to ground. The No. 1 pin of timer 42 is also connected to the No. 4 pin through capacitor 61 and to the No. 6 and 7 pins through capacitor 62. The No. 6 and 7 pins of timer 42 are connected to the power line 78 through resistor 76 while the No. 4 pin is connected to the power line 78 through resistor 75. The No. 8 pin of timer 42 is connected to the power line 78. The No. 3 pin of timer 42 is connected to one input of gate 45. The output of gate 45 is connected to one input of gate 46 and to the base of transistor 48 through resistor 68. The output of gate 46 is connected to the base of transistor 47, through resistor 69. The emitters of transistors 47 and 48 are connected to the power line 78. The collector of transistor 48 is connected to the "OIL" output of the probe 16 through diode 54 while the collector of transistor 47 is connected to the "DRY" output of the probe 16 through diode 55. The trigger line from the slave probe 86 is connected to the No. 2 input of timer 42 via cable 84. The power line is also connected to the slave probe 86 via cable 84. The "OIL" and "DRY" outputs of probe 16 are connected to the corresponding inputs of monitoring means 10 via cable 30.

In the preferred embodiment, switch 40 is a pressure switch available from Micro Pneumatic Logic, Inc. of Fort Lauderdale, Fla. 33309 as Part No. MPL-508G-1.0. Timer 42 is a type ALD 555, transistors 47 through 49 are type PN2907's, gates 43 through 46 are part of a CD4011 chip, diodes 51, 54 and 55 are type IN4001, while diodes 50, 52 and 53 are type IN914, capacitors 56 through 59 are 0.1 microfarad, resistors 64 through 67 are 15K, resistors 68 through 71 are 10K, resistors 72, 73, 74 and 76 are 10M, resistor 75 is 100K, capacitors 60 and 61 are 0.1 microfarad and capacitor 62 is 1 microfarad.

The invention operates as follows. Either a trigger signal from the slave probe or the closing of pressure switch 40 pulls input No. 2 to timer 42 low. This initiates the timer function which will result in a high signal being output on pin No. 3 of the timer for sufficient time to assure that the probe output is picked up by the monitor means 10. This puts a high on one input of gate 45. The monitor means is meanwhile monitoring the probes as described in U.S. Pat. No. 4,736,193 and sending out probe signals. The logic output on the monitor is a "reverse logic" so that a zero is indicated by all the lines A0 through A3 being high. If there is any other number output, then one of the lines A0 through A3 will be low and the input to the base of transistor 49 will be high. This holds the transistor off and results in a low on the other input to gate 45 and a low on one input of gate 46 which will result in a high output on the base of both transistors 47 and 48 holding, them off. When a zero probe signal is output by monitor means 10, then the lines A0 through A3 will all be high and a low will be placed on the base of transistor 49 turning it on and placing a high on the lower inputs of gates 45 and 46. The high on the input of gate 45 (from pin 3 of timer 42) will result in a low output of the gate which will turn transistor 48 on placing a high on the "OIL" output. The low on the output of gate 45 will also keep transistor 47 turned off. If however, switch 40 is open and there is no trigger signal from the slave, pin 3 of timer 42 will stay low and transistor 48 will be held off while a high is placed on the input of gate 46, and when the probe signal number zero is output by the monitor, the output of gate 46 will go low, turning on transistor 47 and placing a high on the "DRY" output of the overfill probe 16.

Figure 3:
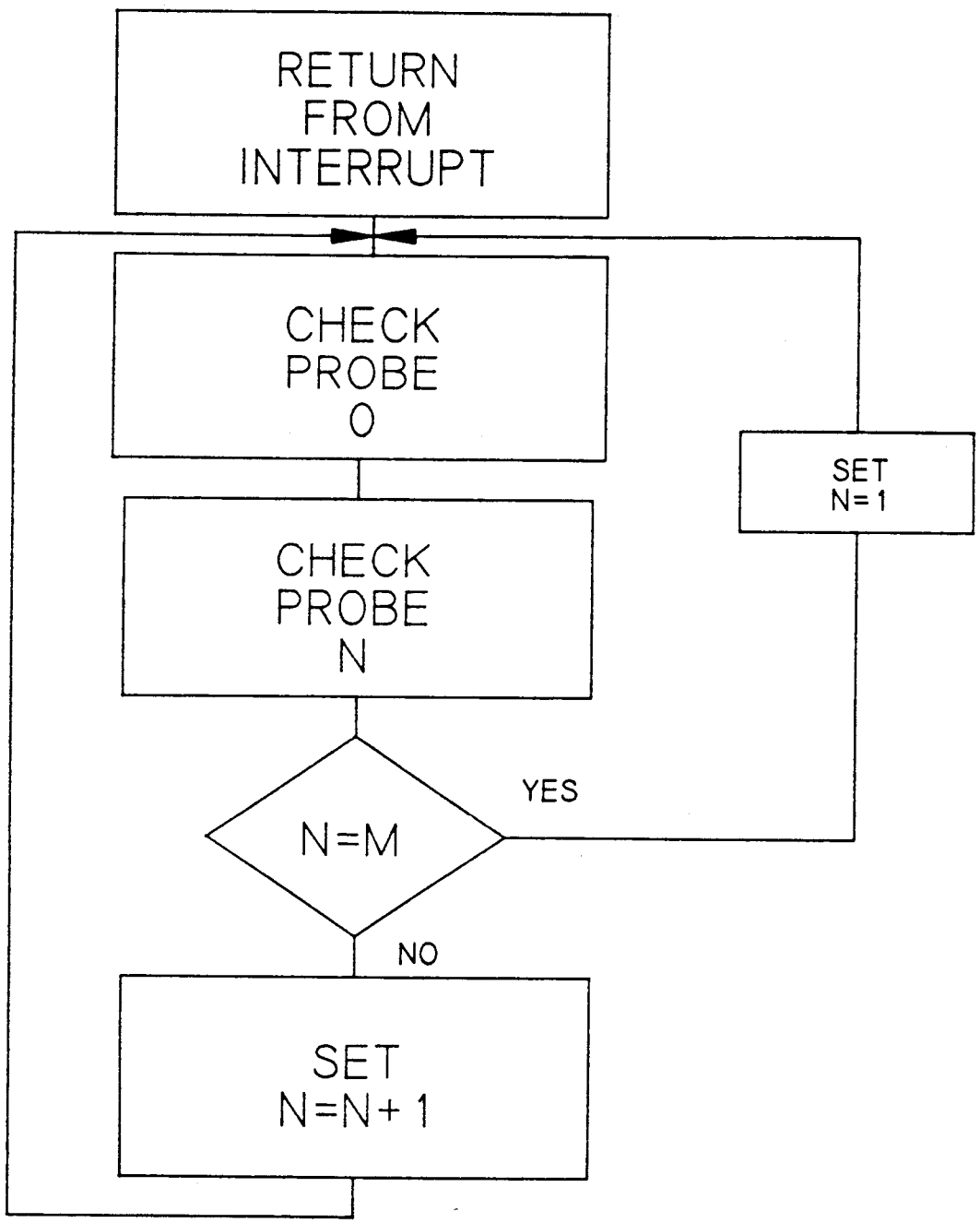
FIG. 3 is a flow chart showing the preferred program for checking the probes according to the invention.
Figure 4:
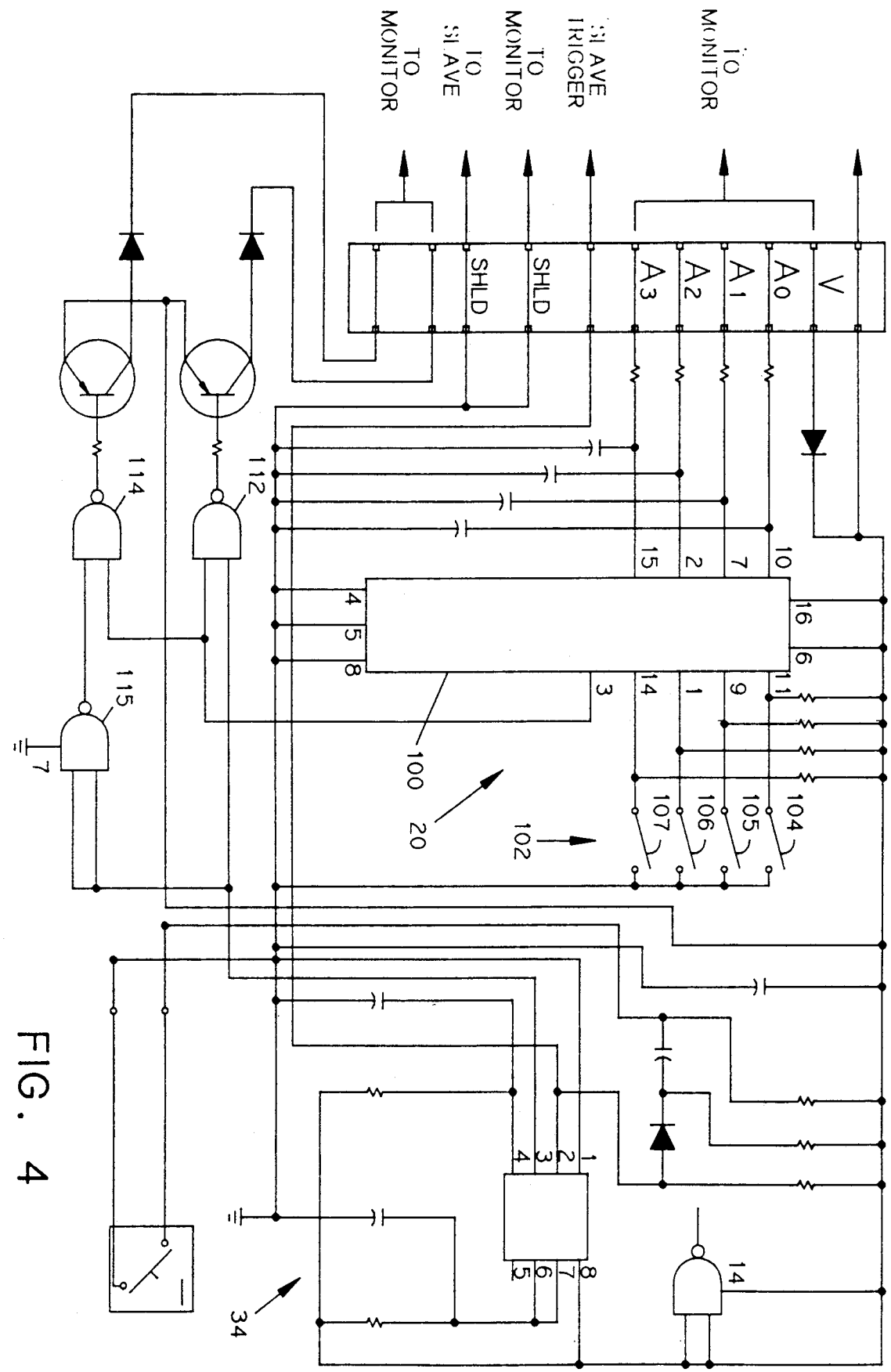
FIG. 4 is an electrical circuit diagram of the electronics of an alternative embodiment of the overfill probe according to the invention.

A flow chart of the monitor means software which checks the probes according to the invention is shown in FIG. 3. When the program returns to monitor mode from interrupt, it first checks probe zero by sending a zero probe signal and monitoring the probe status input lines It will than check the next probe to be checked, designated by probe N. If this is the last or Mth probe, it will then set N=1 and then again check probe zero, then check the first probe If N does not equal M, it will increment N by one, return to check the zeroth probe again and then check the next probe Thus every other probe checked will be the overfill probe. In the preferred embodiment, the probe check cycle time is six seconds, so that the overfill probe will be checked every six seconds.

An alternative embodiment of the electronics of the overfill probe 16 is shown in FIG. 4. This circuit includes a conventional probe identifier means 20 common to prior art probes, which identifier means includes a four-bit magnitude comparator 100 preferably a type 74C85, and four-bit dip switch 102. The No. 10, 7, 2 and 15 pins of comparator 100 are connected to the A0 through A3 input lines respectively through 15K resistors and to ground through 0.1 microfarad capacitors, and the No. 11, 9, 1, and 14 terminals are connected to one side of switches 104 through 107 respectively and to the power line 109 through 100K resistors The No. 16 and 6 pins are connected to power line 109 and the No. 4, 5, and 8 pins are connected to ground. The No. 3 pin is connected to the one input of each of gates 112 and 114. The comparator compares the input to its No. 10, 7, 2 and 15 pins to the input of its No. 11, 9, 1, and 14 pins respectively and if the signals on the former match the signal on the latter then a high signal is output at pin 3. The rest of the circuit and the operation is the same as for the circuit of FIG. 2 except that the logic circuit uses an additional gate 115. This circuit allows the identifier number of the overfill probe to be set using the dip switch 102. The identifier can be set to zero by closing all switches 104 through 107 and the operation of the probe 16 and monitor means 10 will be as described in reference to FIGS. 2 and 3.

Figure 5:
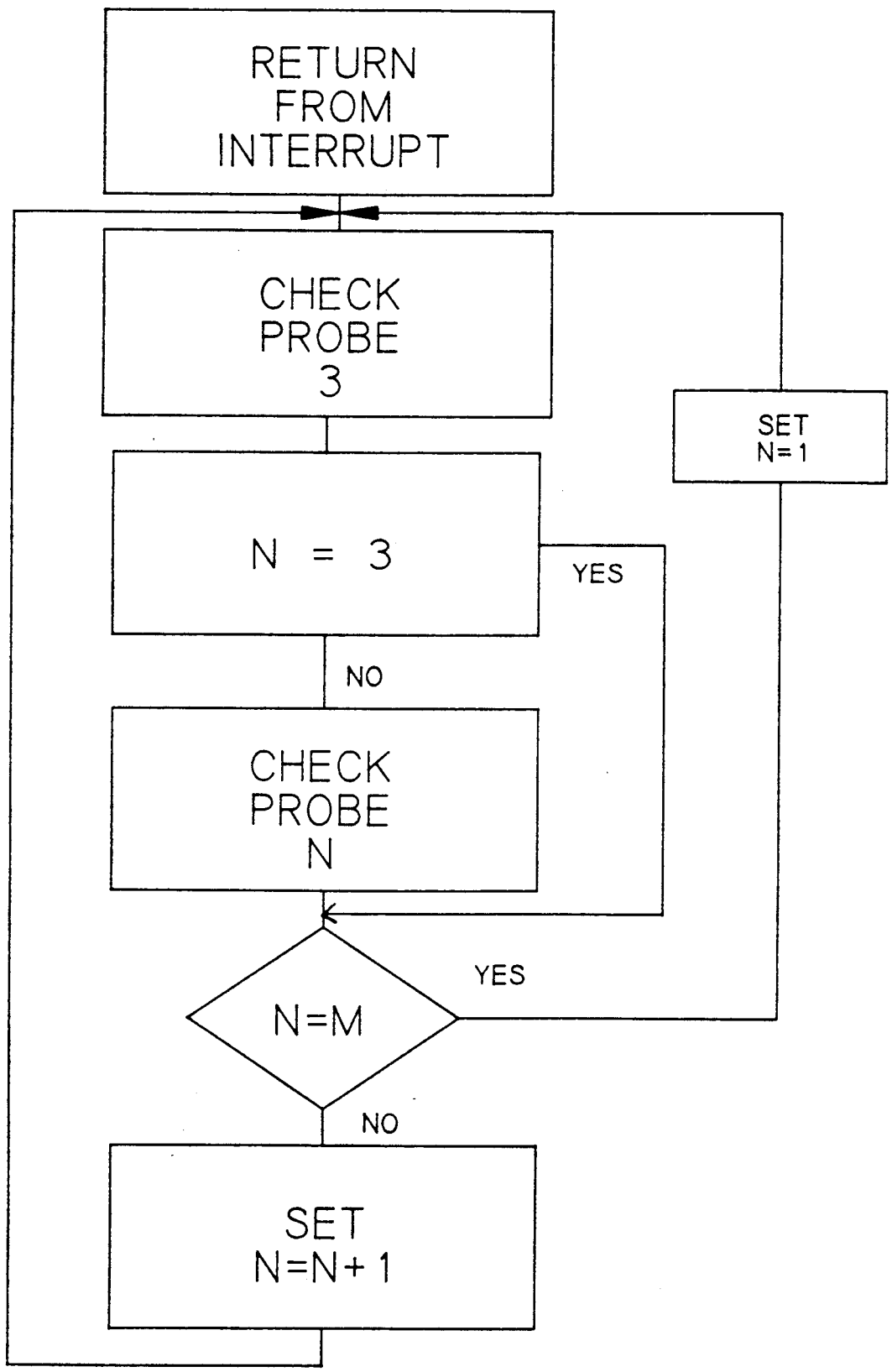
FIG. 5 is a flow chart showing an alternative embodiment of the program for checking the probes according to the invention.

In an alternative embodiment, another identifier number may be selected for all overfill probes, for example, the number 3. In this case, the software of the monitor means 10 would be altered as shown in FIG. 5. After the return from interrupt, the monitor would check probe 3. Then if N was not equal to 3, it would check probe, N, then proceed as described in relation to FIG. 3. If N equals 3, it would skip the Check Probe N step, increment N, and return to check the overfill probe again.

It is a feature of the invention that a simple alteration of the overfill probe and the monitor means software permits the elimination of expensive hardware items, such as a flow meter or fast electronics. This is true both in the embodiments of FIGS. 2 and 3 and FIGS. 4 and 5. The embodiment of FIGS. 2 and 3 further permit the elimination of the comparator and dip switch, as compared to prior art probes. Thus the invention allows one to improve the checking of the overfill probe while at the same time simplifying the probe. For this reason, it is preferable to use an address of zero for the overfill probe.

It has further been discovered that the use of an address of zero for the overfill probe eliminates much error in installing the probes. Having a fixed member for the identifier of the overfill probe prevents errors in assigning identifiers to this critical probe.

There has been described a novel fluid detector that combines improved checking of the overfill probe with simpler probe construction. It is evident that those skilled in the art may now make numerous uses and modifications of the specific embodiments described, without departing from the inventive concepts. For example, the overfill probe can be assigned any other number besides zero and three, so long as the identifier is fixed. Many different equivalent electrical circuits can be used. Consequently, the invention is to be construed as embracing each and every novel feature and novel combination of features present in and/or possessed by the fluid detection system described.

What is claimed is:

1. An apparatus for detecting the presence of fluids comprising:
   a plurality of probes for detecting the fluid state of their environment, said probes including an overfill probe for detecting the approach of the overfill condition in a tank of liquid;
   monitor means for checking the status of said probes, said monitor means including: timing means for clocking a predetermined time period; and overfill checking means responsive to said timing means for checking said overfill probe at lest once during each predetermined time period, said predetermined time period being shorter than the time to check all of said probes; and means for electrically connecting said monitor means and said probes.

2. An apparatus as in claim 1 wherein said overfill checking means comprises means for checking said overfill probe after each of said other probes is checked before the next one of said other probes is checked.

3. An apparatus as in claim 1 and further including means for identifying said overfill probe and each of said other probes with a unique identifier, said identifier for said overfill probe being the numeral zero and the identifier for each of said other probes being an integer equal to or greater than one.

4. Apparatus as in claim 1 wherein said overfill probe includes a master probe and one of more slave probes.

5. Apparatus as in claim 1 wherein said predetermined time is six seconds.

6. Apparatus for detecting the presence of fluids comprising:
- a plurality of probes for detecting the fluid state of their environment;
- monitor means for producing a plurality of probe signals, one probe signal uniquely associated with each of said probes, said monitor means including interrupt means for interrupting the production of probe signals, return means for returning to the production of probe signals after interruption by said interrupt means, and means for producing the probe signal representative of the number zero first upon return from interrupt; and
- means for electrically connecting said monitor means and said probes; wherein:
- each of said probes includes a signal receiving and sending means for producing a status signal indicative of the fluid state of the environment of the probe upon reception of said probe signal uniquely associated with that probe;
- said monitor means includes output means responsive to the status signals for producing an indication of the detected state correlated with each of said probes; and
- one of said probes is an overfill probe and said signal associated with said overfill probe is the signal representative of the number zero.

7. An apparatus as in claim 6 wherein said overfill probe comprises a master probe and one or more slave probes.

8. Apparatus as in claim 6 wherein said monitor means further includes means for producing the probe signal representative of the number zero more frequently than the probe signals associated with probes other than said overfill probe.

* * * * *